(12) United States Patent
Hung et al.

(10) Patent No.: US 9,739,413 B2
(45) Date of Patent: Aug. 22, 2017

(54) ELECTRONIC DEVICE AND DEVICE-SECURING STRUCTURE THEREOF

(71) Applicant: Wistron Corporation, New Taipei (TW)

(72) Inventors: Ming-Hua Hung, New Taipei (TW); Hung-Li Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 93 days.

(21) Appl. No.: 14/609,256

(22) Filed: Jan. 29, 2015

(65) Prior Publication Data
US 2015/0309542 A1 Oct. 29, 2015

(30) Foreign Application Priority Data
Apr. 23, 2014 (TW) .............................. 103114649 A

(51) Int. Cl.
| G06F 1/16 | (2006.01) |
| F16M 11/04 | (2006.01) |
| F16M 13/00 | (2006.01) |
| F16M 13/02 | (2006.01) |

(52) U.S. Cl.
CPC .......... *F16M 11/041* (2013.01); *F16M 13/00* (2013.01); *F16M 13/022* (2013.01); *G06F 1/1632* (2013.01); *G06F 1/1626* (2013.01)

(58) Field of Classification Search
CPC ... G06F 1/1632; G06F 1/1626; F16M 11/041; F16M 13/00; F16M 13/022

USPC ...................... 361/679.41, 679.43, 725, 726; 248/309.1, 689, 671, 316.1, 316.5, 222.11
See application file for complete search history.

(56) References Cited

U.S. PATENT DOCUMENTS

| 2006/0250764 A1 | 11/2006 | Howarth et al. | |
| 2010/0213335 A1 * | 8/2010 | Peng | B60R 11/02 248/276.1 |
| 2012/0025036 A1 * | 2/2012 | Huang | F16M 11/04 248/122.1 |

FOREIGN PATENT DOCUMENTS

| CN | 2735419 Y | * | 10/2005 |
| TW | 201320867 | * | 5/2013 |
| TW | 201320867 A1 | | 5/2013 |

* cited by examiner

*Primary Examiner* — James Wu
(74) *Attorney, Agent, or Firm* — Muncy, Geissler, Olds & Lowe, P.C.

(57) ABSTRACT

A device-securing structure includes a base, a first positioning module and a second positioning module. The base includes a containing portion and a receiving part disposed at a bottom of the containing portion. The first positioning module includes a first positioning member and a second positioning member movably connected with the base, such that the first positioning member and the second positioning member may be moved into the receiving part. The second positioning module includes a third positioning member and a fourth positioning member connected with the base, and the first positioning module is disposed between the third positioning member and the fourth positioning member.

21 Claims, 9 Drawing Sheets

ELECTRONIC DEVICE AND DEVICE-SECURING STRUCTURE THEREOF

BACKGROUND OF THE INVENTION

1. Field of the Invention

The present invention relates to a device-securing structure, and more particularly, to a device-securing structure for securing different portable electronic devices or securing a portable electronic device at different orientations. The present invention further comprises an electronic device having the device-securing structure.

2. Description of the Related Art

Portable electronic devices, such as tablet computers or smart phones, are popular for their advantages of being highly portable and supporting touch input. In order to expand their functions and applications, portable electronic devices may be combined with function expansion modules, such as keyboard modules, or another electronic device, such as a display or a laptop computer.

Generally speaking, there are two major ways to secure a function expansion module to a portable electronic device. The first one is to connect a portable electronic device and a function expansion module with a connector provided therebetween, but this option is not favorable because the connection is not stable or firm and is subject to separation by an external force. The second one is to form a slit or a groove on the housing of a portable electronic device which is insertable by a corresponding structure of a function expansion module. This option is also unsatisfactory because the structural design spoils the appearance of the portable electronic device and is not necessarily suitable for all portable electronic devices.

SUMMARY OF THE INVENTION

A main objective of this invention is to provide a device-securing structure capable of securing different portable electronic devices or securing a portable electronic device at different orientations.

To achieve the aforesaid objective, the device-securing structure of the present invention comprises a base, a first positioning module and a second positioning module. The base comprises a containing portion insertable by a portable electronic device, and the containing portion has a bottom and a receiving part, wherein the receiving part is disposed at the bottom. The first positioning module comprises a first positioning member and a second positioning member, both of which are disposed oppositely and movably connected to the base such that the first positioning member and the second positioning member may be moved into the receiving part. The second positioning module comprises a third positioning member and a fourth positioning member, the third positioning member and the fourth positioning member being disposed oppositely and connected to the base, and the first positioning module being disposed between the third positioning member and the fourth positioning member.

The present invention further comprises an electronic device having the aforesaid device-securing structure.

Using the above-described design, the device-securing structure of the present invention may, according to the insertable width of the portable electronic device, secure two or more portable electronic devices or secure one portable electronic device from different sides, thereby increasing the convenience of use.

DETAILED DESCRIPTION OF THE PREFERRED EMBODIMENT

The advantages and innovative features of the invention will become more apparent from the following detailed description when taken in conjunction with the accompanying drawings.

Figure 1:
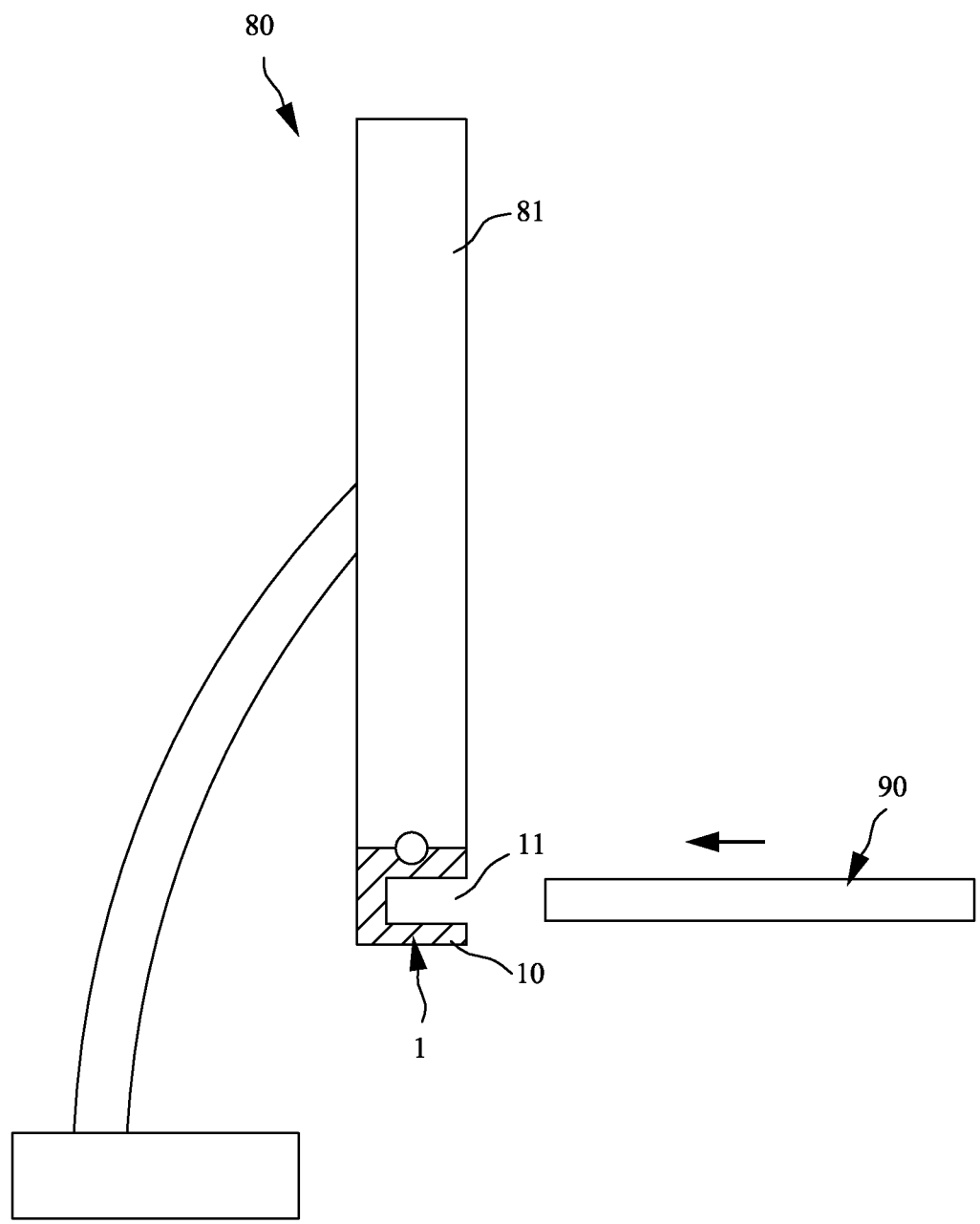
FIG. 1 illustrates an electronic device containing the device-securing structure of the present invention.

FIG. 1 illustrates an electronic device 80 containing the device-securing structure 1 of the present invention.

The device-securing structure 1 of this invention is applicable to the electronic device 80, which can be, but is not limited to, a computer display, a laptop computer or an electronic device with similar functions, and which may be combined with a portable electronic device 90, such as a tablet computer or a smart phone, but this invention is not limited thereto. After being inserted into the device-securing structure 1 of this invention, the portable electronic device 90 is electrically connected to the electronic device 80, thereby enabling communication and operation between the portable electronic device 90 and the electronic device 80. As illustrated in FIG. 1, the electronic device 80 may be a computer display, and the device-securing structure 1 of this invention is rotatably connected to the device main body 81 of the electronic device 80; however, this invention is not limited thereto.

Figure 2:
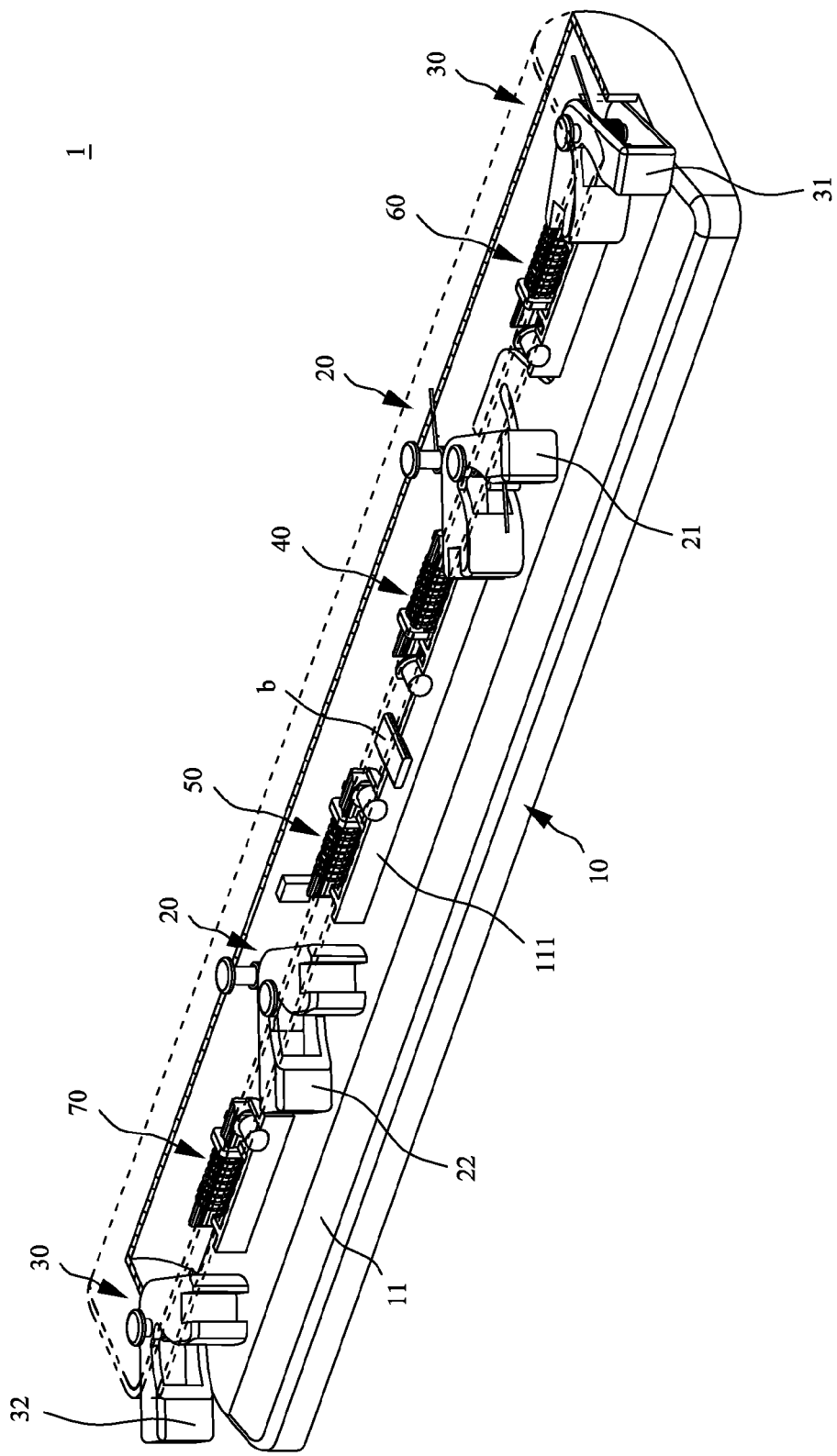
FIG. 2 illustrates a perspective view of the device-securing structure according to a first embodiment of the present invention.
Figure 3:
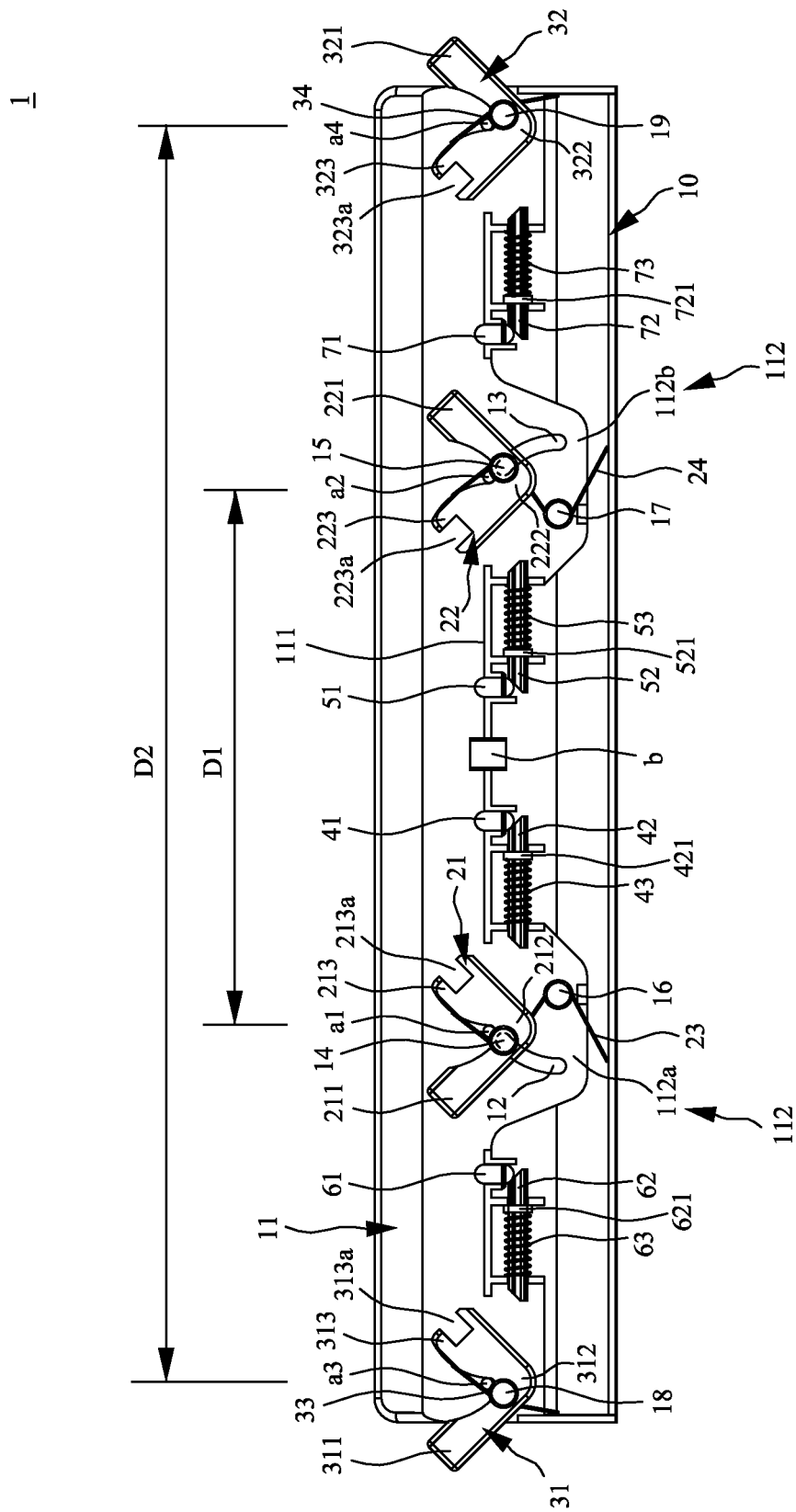
FIG. 3 illustrates a cross-sectional view of the device-securing structure according to the first embodiment of the present invention.

Refer to FIGS. 2 and 3, wherein FIG. 2 illustrates a perspective view of the device-securing structure 1 according to a first embodiment of the present invention, and FIG. 3 illustrates a cross-sectional view of the device-securing structure 1 according to the first embodiment of the present invention.

As illustrated in FIGS. 2 and 3, the device-securing structure 1 of this invention comprises a base 10, a first positioning module 20 and a second positioning module 30. For the purpose of clearly illustrating the components and configuration of the device-securing structure 1 of this invention, part of the base 10 is represented by broken lines in FIG. 2.

The base 10, which may be connected to the device main body 81 shown in FIG. 1, is a housing made of plastic material and comprises a containing portion 11 insertable by the portable electronic device 90. The containing portion 11 has a bottom 111 and a receiving part 112, wherein the receiving part 112 is disposed at the bottom 111. In the following embodiments of this invention, the receiving part 112 may comprise a first receiving groove 112a and a second receiving groove 112b, but this invention is not limited thereto.

Corresponding to the first positioning module 20, the base 10 further comprises a first guiding groove 12, a second guiding groove 13, a first pivoting member 14, a second pivoting member 15, a first column member 16 and a second column member 17, wherein the first guiding groove 12 is arranged at a position corresponding to the first receiving groove 112a, and the second guiding groove 13 is arranged at a position corresponding to the second receiving groove 112b. The first pivoting member 14 is disposed in the first guiding groove 12 and movable along the first guiding groove 12, and the second pivoting member 15 is disposed in the second guiding groove 13 and movable along the second guiding groove 13. In this embodiment, the first guiding groove 12 and the second guiding groove 13 are both a curved groove; the first column member 16 is disposed at the corresponding center of the circle of the first guiding groove 12, and the second column member 17 is disposed at the corresponding center of the circle of the second guiding groove 13.

Corresponding to the second positioning module 30, in this embodiment, the base 10 further comprises a third pivoting member 18 and a fourth pivoting member 19, and all components of the base 10 provided corresponding to the first positioning module 20 are disposed between the third pivoting member 18 and the fourth pivoting member 19.

The first positioning module 20 comprises a first positioning member 21 and a second positioning member 22, both of which are disposed oppositely and movably connected to the base 10, and a first gap D1 is defined between the first positioning member 21 and the second positioning member 22. The first gap D1 may vary according to the movement of the first positioning member 21 and the second positioning member 22. In this embodiment, the first positioning member 21 and the second positioning member 22 are two components with corresponding structures. For example, the first positioning member 21 and the second positioning member 22 may be the same L-shaped, C-shaped, or V-shaped structural members, but this invention is not limited thereto.

The first positioning member 21 comprises a first retaining end 211, a first pivoting part 212 and a first operative end 213, wherein the first pivoting part 212 is arranged between the first retaining end 211 and the first operative end 213, and the first positioning member 21 is pivotally connected with the first pivoting member 14 of the base 10 by the first pivoting part 212, such that the first positioning member 21 is rotatable relative to the base 10. The second positioning member 22 comprises a second retaining end 221, a second pivoting part 222 and a second operative end 223, wherein the second pivoting part 222 is arranged between the second retaining end 221 and the second operative end 223, and the second positioning member 22 is pivotally connected with the second pivoting member 15 of the base 10 by the second pivoting part 222, such that the second positioning member 22 is rotatable relative to the base 10.

In addition, the first positioning module 20 further comprises a first elastic member 23 and a second elastic member 24. In this embodiment, the first elastic member 23 is a torsional spring, which has one end wound about the first pivoting member 14 and abutted against the first positioning member 21 to reposition the first positioning member 21 after it has rotated relative to the base 10, and the other end wound about the first column member 16 and abutted against the base 10 to reposition the first positioning member 21 after it has moved relative to the base 10 along the first guiding groove 12. The presence of the first elastic member 23 allows both the first operative end 213 and the first retaining end 211 to protrude from the bottom 111 of the containing portion 11 when the first positioning member 21 has not been rotated.

The second elastic member 24 is also a torsional spring, which has one end wound about the second pivoting member 15 and abutted against the second positioning member 22 to reposition the second positioning member 22 after it has rotated relative to the base 10, and the other end wound about the second column member 17 and abutted against the base 10 to reposition the second positioning member 22 after it has moved relative to the base 10 along the second guiding groove 13. The presence of the second elastic member 24 allows both the second operative end 223 and the second retaining end 221 to protrude from the bottom 111 of the containing portion 11 when the second positioning member 22 has not been rotated.

The second positioning module 30 comprises a third positioning member 31 and a fourth positioning member 32. The third positioning member 31 and the fourth positioning member 32 are disposed oppositely and both fixedly connected to the base 10, and a second gap D2, which is greater than the first gap D1, is defined between the third positioning member 31 and the fourth positioning member 32, such that the first positioning module 20 is disposed between the third positioning member 31 and the fourth positioning member 32. In this embodiment, the third positioning member 31 and the fourth positioning member 32 are two components with corresponding structures. For example, the third positioning member 31 and the fourth positioning member 32 may be the same L-shaped, C-shaped or V-shaped structural members, but this invention is not limited thereto.

The third positioning member 31 comprises a third retaining end 311, a third pivoting part 312 and a third operative end 313, wherein the third pivoting part 312 is arranged between the third retaining end 311 and the third operative end 313, and the third positioning member 31 is pivotally connected with the third pivoting member 18 of the base 10 by the third pivoting part 312, such that the third positioning member 31 is rotatable relative to the base 10. The fourth positioning member 32 comprises a fourth retaining end 321, a fourth pivoting part 322 and a fourth operative end 323, wherein the fourth pivoting part 322 is arranged between the fourth retaining end 321 and the fourth operative end 323, and the fourth positioning member 32 is pivotally connected with the fourth pivoting member 19 of the base 10 by the fourth pivoting part 322, such that the fourth positioning member 32 is rotatable relative to the base 10.

In addition, the second positioning module 30 further comprises a third elastic member 33 and a fourth elastic member 34. In this embodiment, the third elastic member 33 is a torsional spring wound about the third pivoting member 18 and has one end abutted against the third positioning member 31 and the other end abutted against the base 10, thereby repositioning the third positioning member 31 after it has rotated relative to the base 10. The presence of the third elastic member 33 allows both the third operative end 313 and the third retaining end 311 to protrude from the bottom 111 of the containing portion 11 when the third positioning member 31 has not been rotated.

The fourth elastic member 34 is a torsional spring wound about the fourth pivoting member 19 and has one end abutted against the fourth positioning member 32 and the other end abutted against the base 10, thereby repositioning the fourth positioning member 32 after it has rotated relative to the base 10. The presence of the fourth elastic member 34 allows both the fourth operative end 323 and the fourth retaining end 321 to protrude from the bottom 111 of the containing portion 11 when the fourth positioning member 32 has not been rotated.

In this embodiment, the device-securing structure 1 of this invention further comprises a first engagement module 40 and a second engagement module 50, both of which are connected with the base 10. The first engagement module 40 comprises a first driving member 41, a first engagement member 42 and a first spring 43; one end of the first driving member 41 protrudes from the bottom 111 of the containing portion 11 and the other end is abutted against an oblique structure of the first engagement member 42, such that when the first driving member 41 is pressed and moved, the first engagement member 42 is driven to move toward the first positioning member 21. The first spring 43 has two ends respectively abutted against the first protrusion part 421 of the first engagement member 42 and the base 10, thereby repositioning the first engagement member 42 after it has moved relative to the base 10.

The second engagement module 50 comprises a second driving member 51, a second engagement member 52 and a second spring 53; one end of the second driving member 51 protrudes from the bottom 111 of the containing portion 11 and the other end is abutted against an oblique structure of the second engagement member 52, such that when the second driving member 51 is pressed, the second engagement member 52 is driven to move toward the second positioning member 22. The second spring 53 has two ends respectively abutted against the second protrusion part 521 of the second engagement member 52 and the base 10, thereby repositioning the second engagement member 52 after it has moved relative to the base 10.

Corresponding to the first engagement module 40, in this embodiment, the first operative end 213 of the first positioning member 21 further comprises a first corresponding engagement part 213a engageable with the first engagement member 42; in this embodiment, the first corresponding engagement part 213a is configured as a groove or a containing portion insertable by the first engagement member 42. Similarly, corresponding to the second engagement module 50, the second operative end 223 of the second positioning member 22 further comprises a second corresponding engagement part 223a engageable with the second engagement member 52; in this embodiment, the second corresponding engagement part 223a is configured as a groove or a containing portion insertable by the second engagement member 52.

In this embodiment, the device-securing structure 1 of this invention further comprises a third engagement module 60 and a fourth engagement module 70, both of which are connected with the base 10. The third engagement module 60 comprises a third driving member 61, a third engagement member 62 and a third spring 63; one end of the third driving member 61 protrudes from the bottom 111 of the containing portion 11 and the other end is abutted against an oblique structure of the third engagement member 62, such that when the third driving member 61 is pressed and moved, the third engagement member 62 is driven to move toward the third positioning member 31. The third spring 63 has two ends respectively abutted against the third protrusion part 621 of the third engagement member 62 and the base 10, thereby repositioning the third engagement member 62 after it has moved relative to the base 10.

The fourth engagement module 70 comprises a fourth driving member 71, a fourth engagement member 72 and a fourth spring 73; one end of the fourth driving member 71 protrudes from the bottom 111 of the containing portion 11 and the other end is abutted against an oblique structure of the fourth engagement member 72, such that when the fourth driving member 71 is pressed, the fourth engagement member 72 is driven to move toward the fourth positioning member 32. The fourth spring 73 has two ends respectively abutted against the fourth protrusion part 721 of the fourth engagement member 72 and the base 10, thereby repositioning the fourth engagement member 72 after it has moved relative to the base 10.

Corresponding to the third engagement module 60, in this embodiment, the third operative end 313 of the third positioning member 31 further comprises a third corresponding engagement part 313a engageable with the third engagement member 62; in this embodiment, the third corresponding engagement part 313a is configured as a groove or a containing portion insertable by the third engagement member 62. Similarly, corresponding to the fourth engagement module 70, the fourth operative end 323 of the fourth positioning member 32 further comprises a fourth corresponding engagement part 323a engageable with the fourth engagement member 72; in this embodiment, the fourth corresponding engagement part 323a is configured as a groove or a containing portion insertable by the fourth engagement member 72.

In addition, in this embodiment, the base 10 of the device-securing structure 1 of this invention further comprises a first obstruction part a1, a second obstruction part a2, a third obstruction part a3 and a fourth obstruction part a4, each of which may be configured as a pin structure, for example. The first obstruction part a1 restrains the rotation direction of the first positioning member 21, such as the counterclockwise direction in the non-rotating state shown in the figure; the second obstruction part a2 restrains the rotation direction of the second positioning member 22, such as the clockwise direction in the non-rotating state shown in the figure; the third obstruction part a3 restrains the rotation direction of the third positioning member 31, such as the counterclockwise direction in the non-rotating state shown in the figure; and the fourth obstruction part a4 restrains the rotation direction of the fourth positioning member 32, such as the clockwise direction in the non-rotating state shown in the figure.

The base 10 of the device-securing structure 1 of this invention further comprises an electrical connector b disposed between the first positioning member 21 and the second positioning member 22. The base 10 is electrically connected with the portable electronic device inserted into the containing portion 11 through the electrical connector b.

Figure 4:
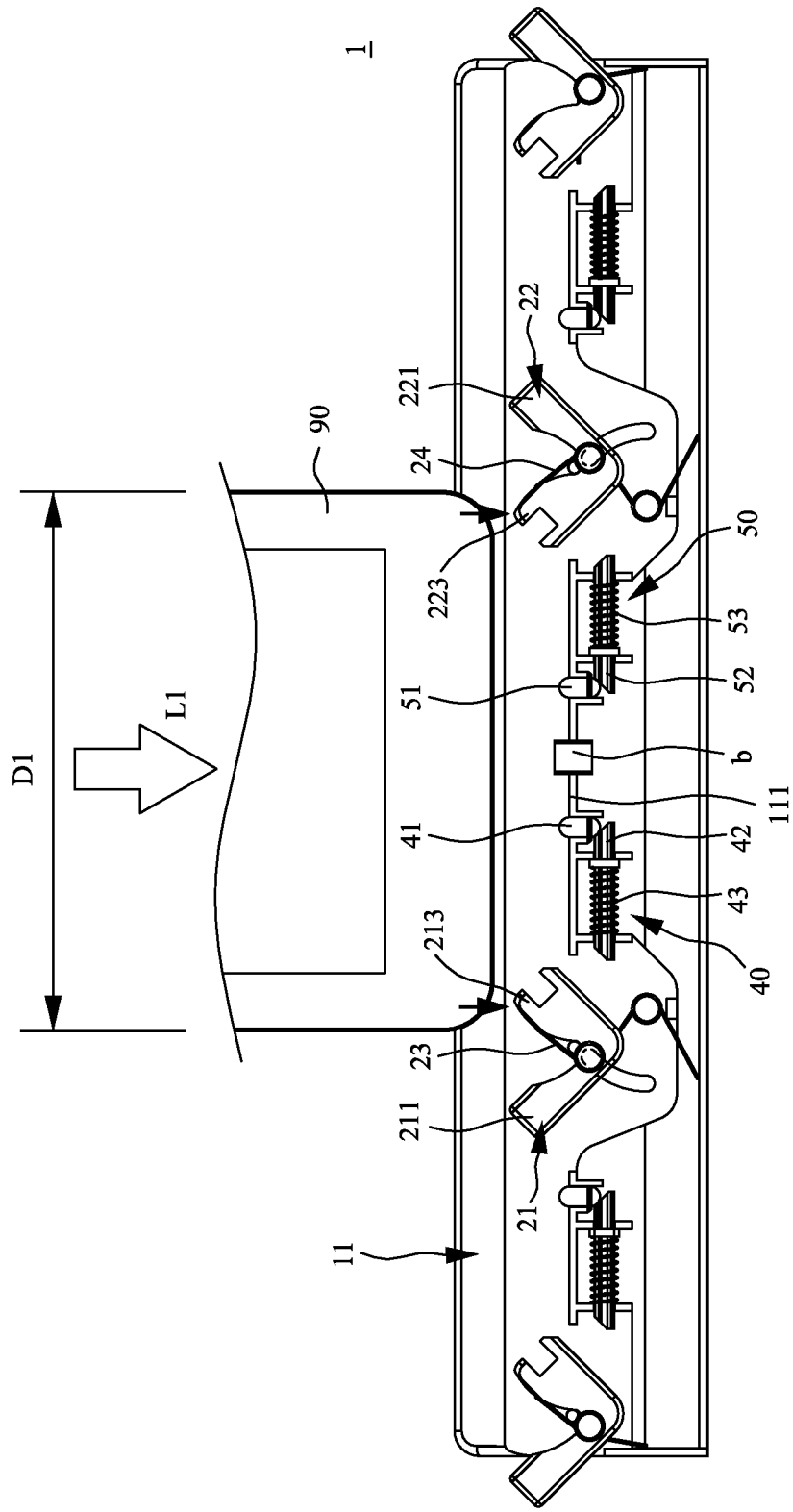
FIG. 4 illustrates a cross-sectional view of the device-securing structure according to the first embodiment of the present invention during the insertion of a portable electronic device.
Figure 5:
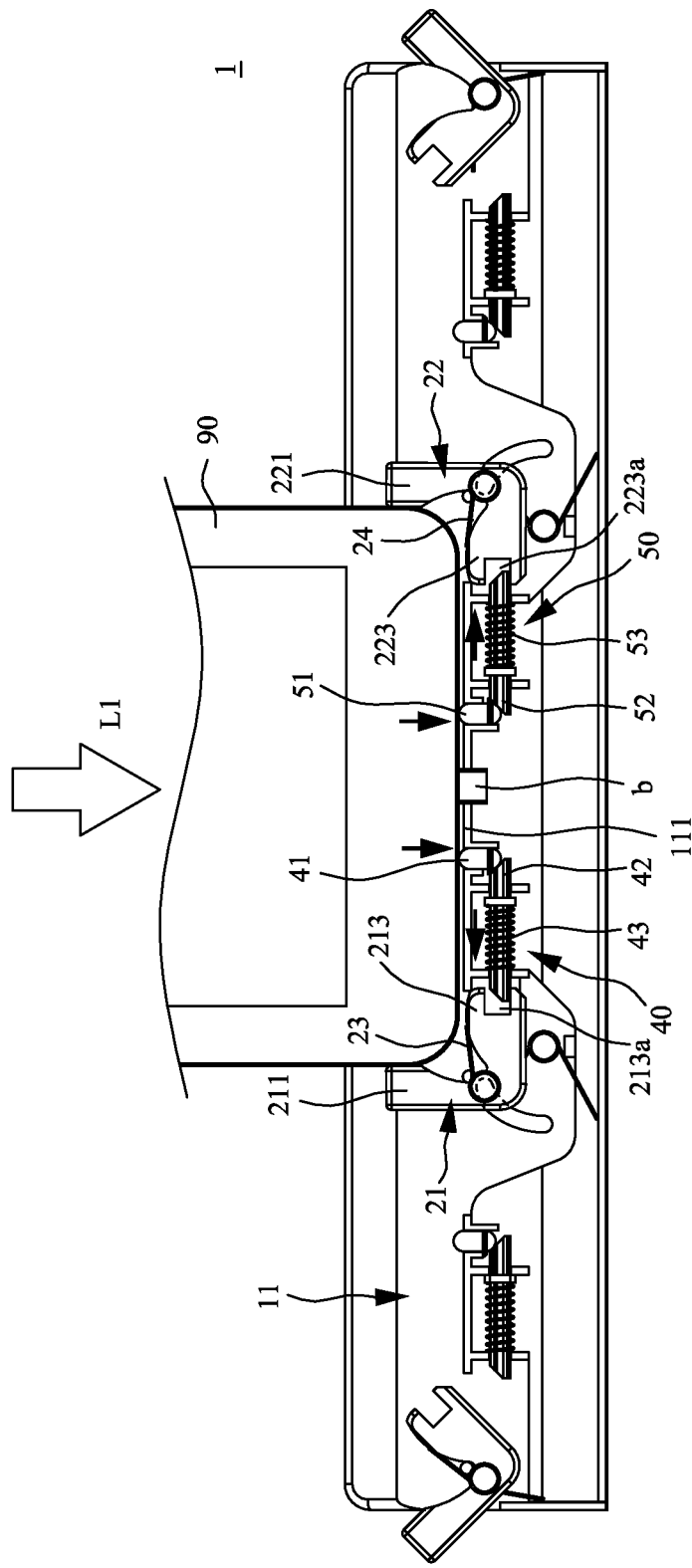
FIG. 5 illustrates a cross-sectional view of the device-securing structure according to the first embodiment of the present invention after the insertion of a portable electronic device.

Refer to FIGS. 4 and 5, wherein FIG. 4 illustrates the device-securing structure 1 according to the first embodiment of the present invention during the insertion of the portable electronic device 90, and FIG. 5 illustrates the device-securing structure according to the first embodiment of the present invention after the insertion of the portable electronic device 90. As shown in FIG. 4, before any portable electronic device has been inserted into the device-securing structure 1 of this invention, each of the first positioning member 21, the second positioning member 22, the third positioning member 31 and the fourth positioning member 32 has two ends protruding from the bottom 111 of the containing portion 11.

If the portable electronic device 90 has an insertable width substantially equal to the first gap D1, then when the connection port (not shown) of the portable electronic device 90 is aligned to the electrical connector b of the base 10 and is gradually inserted into the containing portion 11 in the direction of arrow L1 perpendicular to the bottom 111, the portable electronic device 90 first comes in contact with and presses the first operative end 213 of the first positioning member 21 and the second operative end 223 of the second positioning member 22. Meanwhile, the first positioning member 21 is rotated clockwise when the first operative end 213 is actuated, and the second positioning member 22 is rotated counterclockwise when the second operative end 223 is actuated.

When the portable electronic device 90 is moved close to the bottom 111 of the containing portion 11, as illustrated in FIG. 5, the first driving member 41 of the first engagement module 40 and the second driving member 51 of the second engagement module 50 will also be actuated, such that the first engagement member 42 is driven to move parallel to the bottom 111 toward the first positioning member 21, and the second engagement member 52 is driven to move parallel to the bottom 111 toward the second positioning member 22.

As shown in FIG. 5, after the portable electronic device 90 has been completely inserted into the containing portion 11, the first operative end 213 is rotated to the position below the bottom 111, such that the first positioning member 21 is abutted against the portable electronic device 90 with the first retaining end 211; similarly, the second operative end 223 is also rotated to the position below the bottom 111, such that the second positioning member 22 is abutted against the portable electronic device 90 with the second retaining end 221. Accordingly, the portable electronic device 90 may be secured and clamped by the first retaining end 211 of the first positioning member 21 and the second retaining end 221 of the second positioning member 22.

After the first positioning member 21 has been rotated to the predetermined position, the first engagement member 42 of the first engagement module 40 thus moved will engage the first corresponding engagement part 213a of the first operative end 213, so as to restrain the first positioning member 21 from rotating counterclockwise, and the first spring 43 is in a compressed state. After the second positioning member 22 has been rotated to the predetermined position, the second engagement member 52 of the second engagement module 50 thus moved will engage the second corresponding engagement part 223a of the second operative end 223, so as to restrain the second positioning member 22 from rotating clockwise, and the second spring 53 is in a compressed state. Therefore, the portable electronic device 90 is secured by the first positioning member 21 and the second positioning member 2.

Conversely, when the portable electronic device 90 is gradually removed from the containing portion 11 in a direction opposite to the direction of arrow L1, the first driving member 41 is gradually disengaged from the first engagement member 42 when the portable electronic device 90 is gradually moved away from the bottom 111 of the containing portion 11, such that the first engagement member 42 is repositioned to the original position by the elastic resilience of the first spring 43 and separated from the first corresponding engagement part 213a of the first operative end 213. The second driving member 51 is also gradually disengaged from the second engagement member 52, such that the second engagement member 52 is repositioned to the original position by the elastic resilience of the second spring 53 and separated from the second corresponding engagement part 223a of the second operative end 223. Consequently, the first engagement module 40 and the second engagement module 50 will eventually return to the original state as illustrated in FIG. 4.

When the portable electronic device 90 is gradually removed from the containing portion 11, the first operative end 213 of the first positioning member 21 and the second operative end 223 of the second positioning member 22 are no longer pressed by the portable electronic device 90, making the first positioning member 21 rotate counterclockwise because of the elastic resilience from the first elastic member 23, and making the second positioning member 22 rotate clockwise because of the elastic resilience from the second elastic member 24. Consequently, the first positioning member 21 and the second positioning member 22 will also eventually return to the original state as illustrated in FIG. 4.

Figure 6:
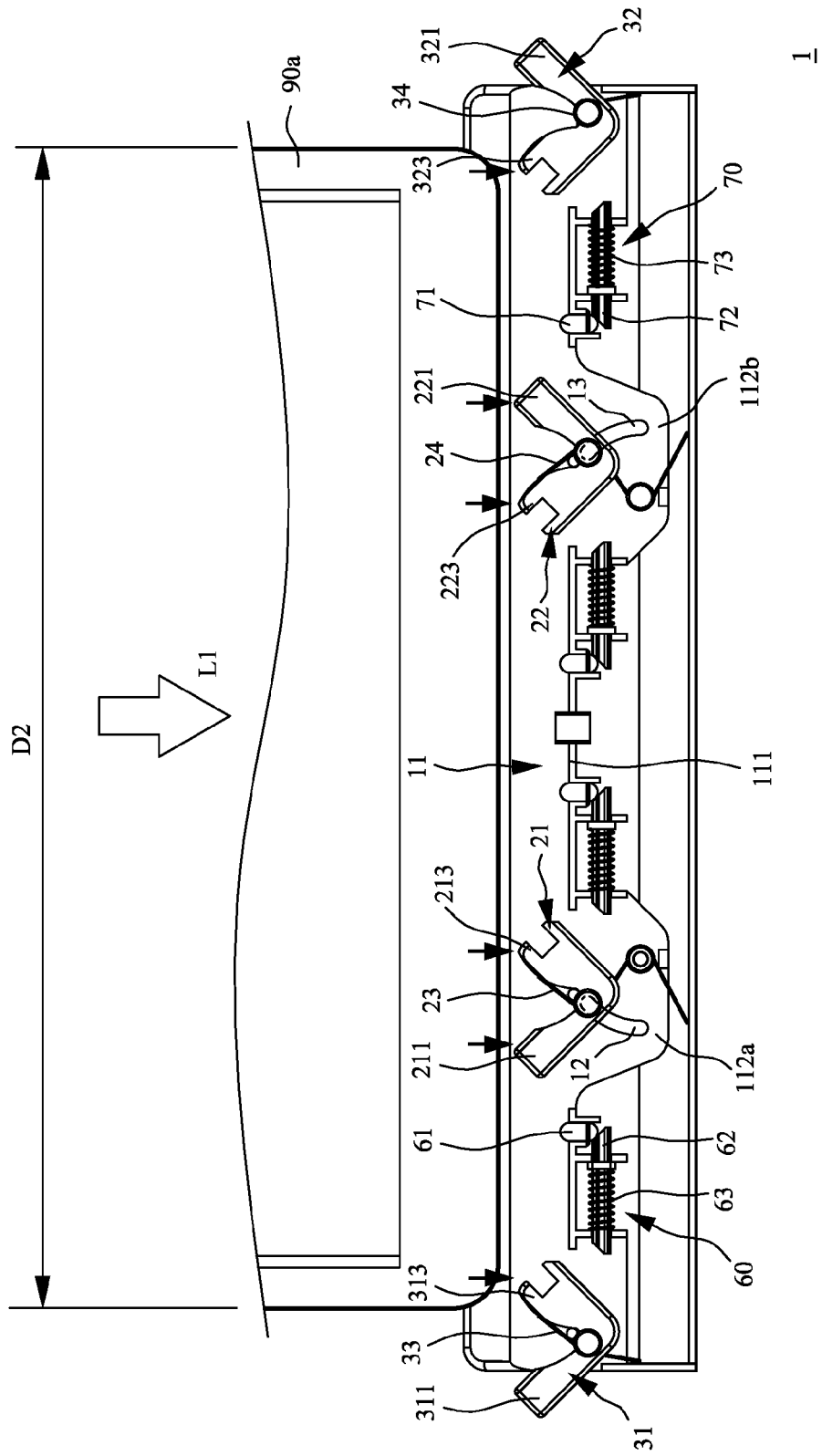
FIG. 6 illustrates a cross-sectional view of the device-securing structure according to the first embodiment of the present invention during the insertion of another portable electronic device.
Figure 7:
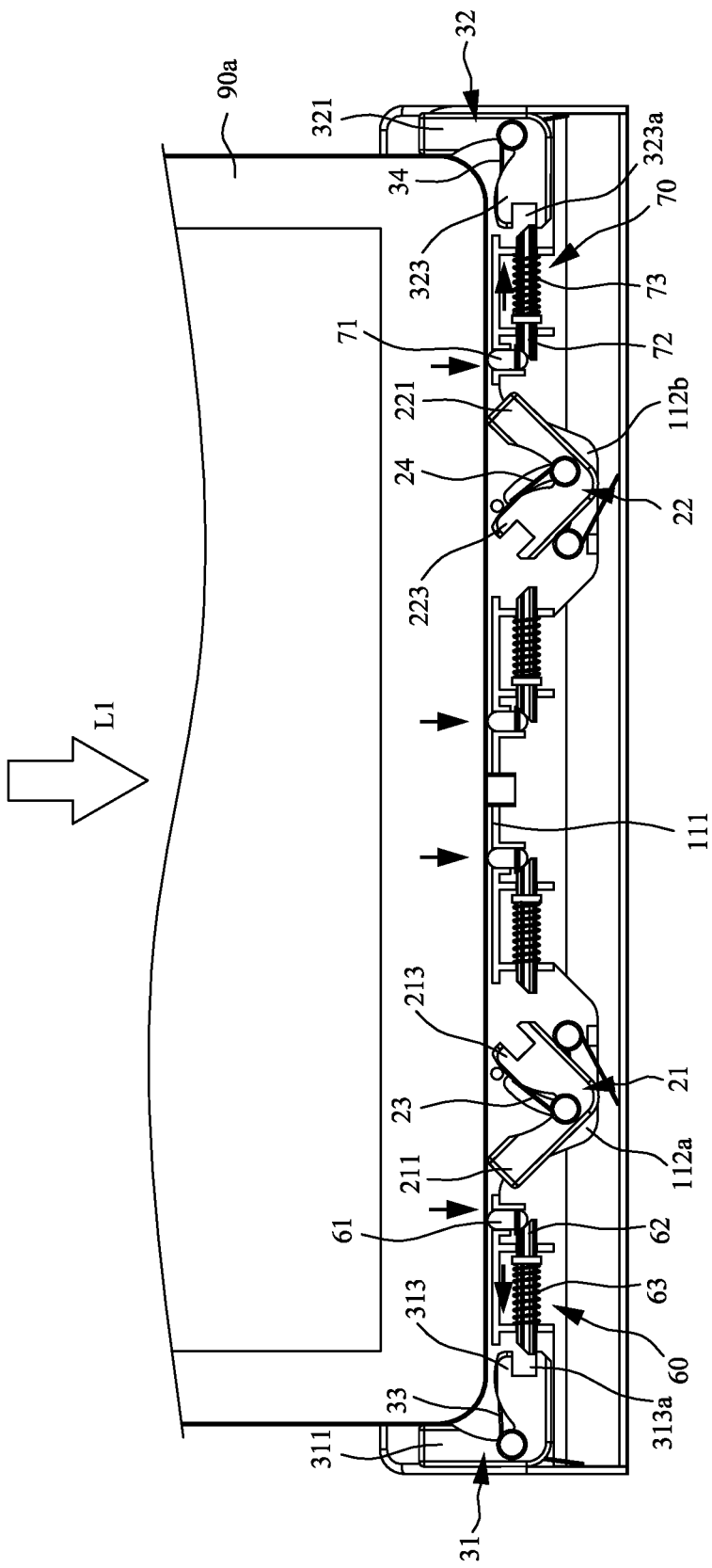
FIG. 7 illustrates a cross-sectional view of the device-securing structure according to the first embodiment of the present invention after the insertion of another portable electronic device.

Refer to FIGS. 6 and 7, wherein FIG. 6 illustrates the device-securing structure 1 according to the first embodiment of the present invention during the insertion of another portable electronic device 90a, and FIG. 7 illustrates the device-securing structure 1 according to the first embodiment of the present invention after the insertion of another portable electronic device 90a. The portable electronic device 90a exemplified here may be another device with a size different from that of the portable electronic device 90 illustrated in FIG. 4, or the same portable electronic device 90 as illustrated in FIG. 4 but inserted from a side with a different width, such as the portable electronic device 90 being inserted after being rotated 90 degrees.

As shown in FIG. 6, if the portable electronic device 90a has an insertable width substantially equal to the second gap D2, then when the connection port (not shown) of the portable electronic device 90a is aligned to the electrical connector b of the base 10 and gradually inserted into the containing portion 11 in the direction of arrow L1 perpendicular to the bottom 111, the portable electronic device 90a first comes in contact with and presses the third operative end 313 of the third positioning member 31 and the fourth operative end 323 of the fourth positioning member 32. Because the portable electronic device 90a has an insertable width greater than the first gap D1 between the first positioning member 21 and the second positioning member 22, the portable electronic device 90a will press against the first retaining end 211 and the first operative end 213 of the first positioning member 21 and the second retaining end 221 and the second operative end 223 of the second positioning member 22.

Meanwhile, the outer third positioning member 31 rotates clockwise when the third operative end 313 is actuated, and the outer fourth positioning member 32 rotates counterclockwise when the fourth operative end 323 is actuated, as illustrated by the figure. The first positioning member 21 and the second positioning member 22 are not rotatable because both ends thereof are pressed, so the first positioning member 21 is pressed and moved along the first guiding groove 12 toward the first receiving groove 112a, and the second positioning member 22 is pressed and moved along the second guiding groove 13 toward the second receiving groove 112b.

When the portable electronic device 90a is moved close to the bottom 111 of the containing portion 11, as illustrated in FIG. 7, the third driving member 61 of the third engagement module 60 and the fourth driving member 71 of the fourth engagement module 70 will also be actuated, such that the third engagement member 62 is driven to move parallel to the bottom 111 toward the third positioning member 31, and the fourth engagement member 72 is driven to move parallel to the bottom 111 toward the fourth positioning member 32.

As shown in FIG. 7, after the portable electronic device 90a has been completely inserted into the containing portion 11, the first positioning member 21 is moved into the first receiving groove 112a and below the bottom 111, and the second positioning member 22 is moved into the second receiving groove 112b and below the bottom 111. Thus, if the portable electronic device 90a has a greater insertable width, the first positioning member 21 and the second positioning member 22 will not cause interference to the portable electronic device 90a.

In addition, since the third operative end 313 has been actuated and rotated to the position below the bottom 111, the third positioning member 31 will be abutted against the portable electronic device 90a with the third retaining end 311; similarly, since the fourth operative end 323 has also been actuated and rotated to the position below the bottom 111, the fourth positioning member 32 will be abutted against the portable electronic device 90a with the fourth retaining end 321. Therefore, the portable electronic device 90a may be secured and clamped by the third retaining end 311 of the third positioning member 31 and the fourth retaining end 321 of the fourth positioning member 32.

After the third positioning member 31 has been rotated to the predetermined position, the third engagement member 62 of the third engagement module 60 thus moved will also engage the third corresponding engagement part 313a of the third operative end 313 so as to restrain the third positioning member 31 from rotating counterclockwise, and the third spring 63 is in a compressed state; after the fourth positioning member 32 has been rotated to the predetermined position, the fourth engagement member 72 of the fourth engagement module 70 thus moved will also engage the fourth corresponding engagement part 323a of the fourth operative end 323, so as to restrain the fourth positioning member 32 from rotating clockwise, and the fourth spring 73 will be in a compressed state, thereby securing the portable electronic device 90a with the third positioning member 31 and the fourth positioning member 32.

Conversely, when the portable electronic device 90a is gradually removed from the containing portion 11 in a direction opposite to the direction of arrow L1, the third driving member 61 is gradually disengaged from the third engagement member 62 when the portable electronic device 90a is gradually moved away from the bottom 111 of the containing portion 11, such that the third engagement member 62 is repositioned to the original position by the elastic resilience of the third spring 63 and separated from the third corresponding engagement part 313a of the third operative end 313. The fourth driving member 71 is also gradually disengaged from the fourth engagement member 72, such that the fourth engagement member 72 is repositioned to the original position by the elastic resilience of the fourth spring 73 and separated from the fourth corresponding engagement part 323a of the fourth operative end 323. Consequently, the third engagement module 60 and the fourth engagement module 70 will eventually return to the original state as illustrated in FIG. 6.

When the portable electronic device 90a is gradually removed from the containing portion 11, the first positioning member 21 is no longer pressed by the portable electronic device 90a, such that the first positioning member 21 is repositioned to the original position along the first guiding groove 12 by the elastic resilience of the first elastic member 23; similarly, the second positioning member 22 is also no longer pressed by the portable electronic device 90a, such that the second positioning member 22 is repositioned to the original position along the second guiding groove 13 by the elastic resilience of the second elastic member 24. Consequently, the first positioning member 21 and the second positioning member 22 will eventually return to the original state as illustrated in FIG. 6.

When the portable electronic device 90a is gradually removed from the containing portion 11, the third operative end 313 of the third positioning member 31 and the fourth operative end 323 of the fourth positioning member 32 are no longer pressed by the portable electronic device 90a, making the third positioning member 31 rotate counterclockwise because of the elastic resilience from the third elastic member 33 and the fourth positioning member 32 rotate clockwise because of the elastic resilience from the fourth elastic member 34. Consequently, the third positioning member 31 and the fourth positioning member 32 will also eventually return to the original state as illustrated in FIG. 6.

Figure 8:
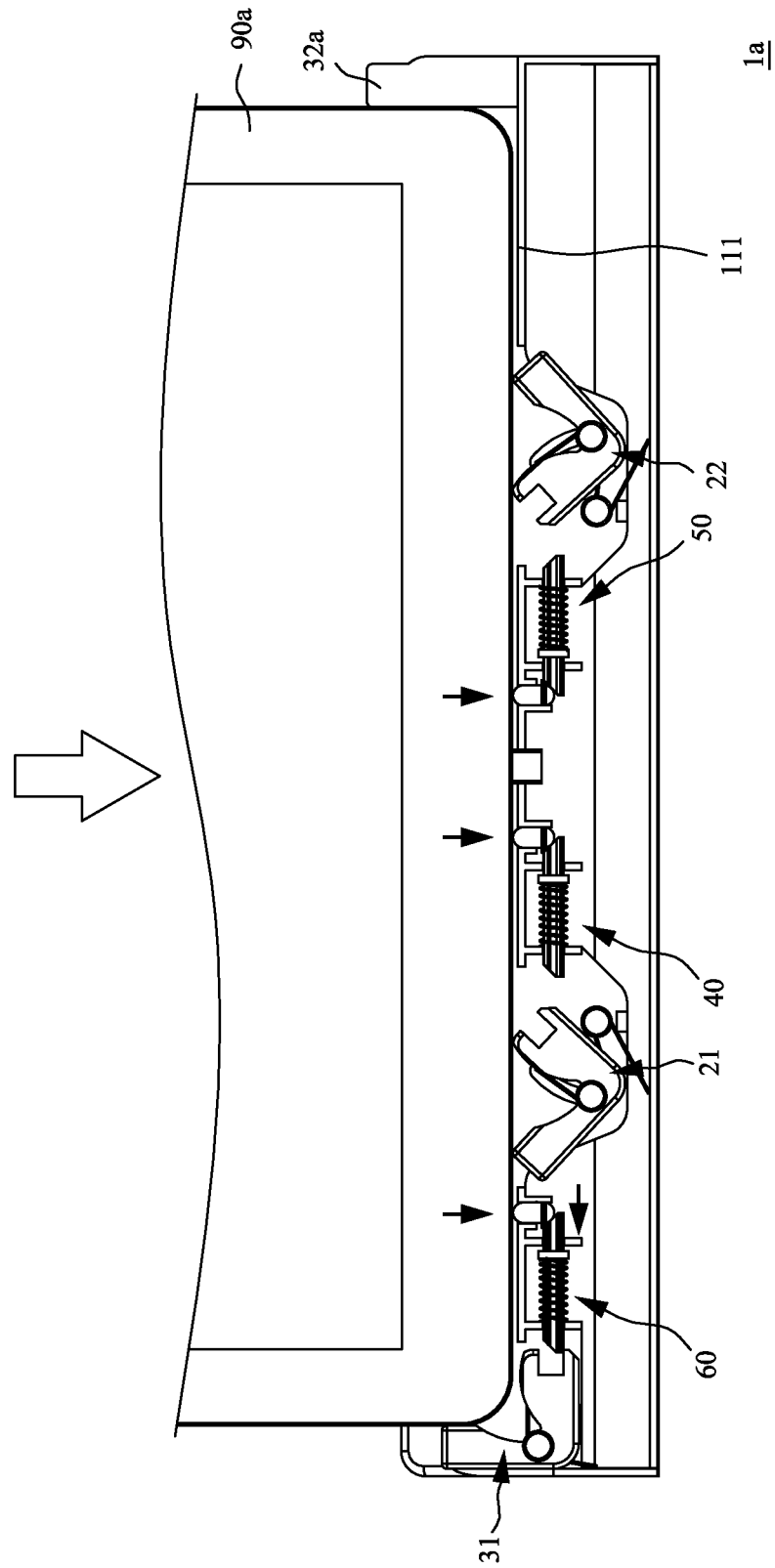
FIG. 8 illustrates a cross-sectional view of the device-securing structure according to a second embodiment of the present invention after the insertion of another portable electronic device.

FIG. 8 illustrates the device-securing structure 1a according to a second embodiment of the present invention after the insertion of another portable electronic device 90a. The second embodiment is a variation of the first embodiment. In this embodiment, the fourth engagement module 70 illustrated in FIG. 5 is eliminated, and the fourth positioning member 32 rotatably connected to the base 10, as illustrated in FIG. 6, is substituted by a fourth positioning member 32a fixedly connected to the base 10, such as a guiding column protrudingly disposed at the bottom 111, but this invention is not limited thereto. Accordingly, during the insertion of the portable electronic device 90a into the containing portion 11 of the base 10, one side of the portable electronic device 90a may rest against the fourth positioning member 32a and inserted, and the other side is abutted against the third positioning member 31 and rotated, thereby achieving the securing effect as described above.

Using the aforesaid design, the device-securing structure 1 and 1a of this invention is capable of securing two or more portable electronic devices of different sizes or securing one portable electronic device from different sides with different widths, thereby increasing the convenience of use and applicability.

Figure 9:
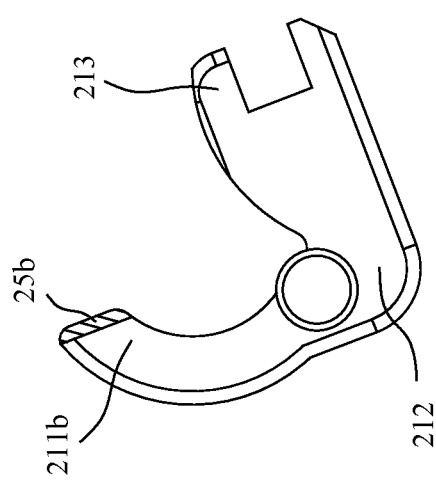
FIG. 9 illustrates a first positioning member of the device-securing structure according to a third embodiment of the present invention.

FIG. 9 illustrates the first positioning member 21b of the device-securing structure according to a third embodiment of the present invention. The third embodiment is a variation of the first embodiment, in which the design of each positioning member is modified. It should be noted that here the first positioning member 21b is taken as an example for illustration, but other positioning members, such as the second positioning member 22, the third positioning member 31 and the fourth positioning member 32 may also be implemented with the same structural design.

As illustrated in FIG. 9, in this embodiment, the first positioning member 21b is configured as a C-shaped structural member, such that the first retaining end 211b thereof forms a bent rod. In order to enhance the securing effect on the portable electronic device after the first positioning member 21*b* has been rotated, the first retaining end 211*b* of the first positioning member 21*b* is provided with an auxiliary securing member 25*b*, which may be made of elastic or a plastic material, such as rubber or foam. Therefore, after the first positioning member 21*b* has been rotated, the presence of the auxiliary securing member 25*b* may offset and compensate the gap possibly formed between the first retaining end 211*b* and the portable electronic device and increase the frictional force so as to more firmly and stably secure the portable electronic device. In addition, other positioning members may also be provided with a similar auxiliary securing member.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A device-securing structure, comprising:
   a base comprising a containing portion insertable by a portable electronic device, the containing portion having a bottom and a receiving part, wherein the receiving part is disposed at the bottom;
   a first positioning module comprising a first positioning member and a second positioning member, the first positioning member and the second positioning member being disposed oppositely and movably connected to the base such that the first positioning member and the second positioning member may be moved into the receiving part by pressing of the portable electronic device; and
   a second positioning module comprising a third positioning member and a fourth positioning member disposed oppositely, the third positioning member and the fourth positioning member being connected to the base, and the first positioning module being disposed between the third positioning member and the fourth positioning member; wherein when the third positioning member and the fourth positioning member clamp the portable electronic device, the first positioning member and the second positioning member are moved into the receiving part by pressing of the portable electronic device.

2. The device-securing structure as claimed in claim 1, wherein the first positioning member comprises a first retaining end, a first pivoting part and a first operative end, the first pivoting part being disposed between the first retaining end and the first operative end, and the first positioning member being pivotally connected with the base with the first pivoting part, such that the first positioning member is rotatable when the first operative end is actuated by pressing of the portable electronic device and secures the portable electronic device with the first retaining end; the second positioning member comprises a second retaining end, a second pivoting part and a second operative end, the second pivoting part being disposed between the second retaining end and the second operative end, and the second positioning member being pivotally connected with the base with the second pivoting part, such that the second positioning member is rotatable when the second operative end is actuated by pressing of the portable electronic device and secures the portable electronic device with the second retaining end.

3. The device-securing structure as claimed in claim 2, wherein the first positioning module further comprises a first elastic member and a second elastic member, the first elastic member being capable of repositioning the first positioning member after the movement or rotation of the first positioning member and allowing the first operative end and the first retaining end to protrude from the bottom of the containing portion when the first positioning member is not rotated, the second elastic member being capable of repositioning the second positioning member after the movement or rotation of the second positioning member and allowing the second operative end and the second retaining end to protrude from the bottom of the containing portion when the second positioning member is not rotated.

4. The device-securing structure as claimed in claim 2, wherein the base further comprises a first guiding groove, a first pivoting member, a second guiding groove and a second pivoting member, the first pivoting member being configured for pivotally connecting to the first pivoting part of the first positioning member and being arranged in the first guiding groove, such that when the first positioning member is pressed, the first positioning member is moved with the first pivoting member along the first guiding groove into the receiving part, and the second pivoting member being configured for pivotally connecting to the second pivoting part of the second positioning member and being arranged in the second guiding groove, such that when the second positioning member is pressed, the second positioning member is moved with the second pivoting member along the second guiding groove into the receiving part.

5. The device-securing structure as claimed in claim 4, wherein the receiving part comprises a first receiving groove and a second receiving groove, the first receiving groove being configured for receiving the first positioning member that has been moved, and the second receiving groove being configured for receiving the second positioning member that has been moved.

6. The device-securing structure as claimed in claim 4, wherein the each of the first guiding groove and the second guiding groove is a curved groove.

7. The device-securing structure as claimed in claim 3, wherein the base further comprises a first obstruction part and a second obstruction part, the first obstruction part being configured to restrain the rotation direction of the first positioning member and the second obstruction part being configured to restrain the rotation direction of the second positioning member.

8. The device-securing structure as claimed in claim 3, further comprising a first engagement module and a second engagement module connected to the base, the first engagement module comprising a first driving member, a first engagement member and a first spring, the first driving member having one end protruding from the bottom and the other end abutted against the first engagement member, such that when the first driving member is pressed, the first driving member drives the first engagement member to move so as to secure the first positioning member that has been rotated; the second engagement module comprising a second driving member, a second engagement member and a second spring, the second driving member having one end protruding from the bottom and the other end abutted against the second engagement member, such that when the second driving member is pressed, the second driving member drives the second engagement member to move so as to secure the second positioning member that has been rotated.

9. The device-securing structure as claimed in claim 8, wherein the first operative end of the first positioning member further comprises a first corresponding engagement part engageable with the first engagement member; the second operative end of the second positioning member further comprises a second corresponding engagement part engageable with the second engagement member.

10. The device-securing structure as claimed in claim 2, wherein the first positioning member further comprises an auxiliary securing member disposed at the first retaining end to increase a clamping strength of the first retaining end on the portable electronic device; the second positioning member further comprises an auxiliary securing member disposed at the second retaining end to increase a clamping strength of the second retaining end on the portable electronic device.

11. The device-securing structure as claimed in claim 8, wherein the third positioning member comprises a third retaining end, a third pivoting part and a third operative end, the third pivoting part being disposed between the third retaining end and the third operative end, and the third positioning member being pivotally connected with the base with the third pivoting part, such that the third positioning member is rotatable when the third operative end is actuated and secures the portable electronic device with the third retaining end.

12. The device-securing structure as claimed in claim 11, wherein the second positioning module further comprises a third elastic member, the third elastic member being capable of repositioning the third positioning member after the rotation of the third positioning member and allowing the third operative end and the third retaining end to protrude from the bottom of the containing portion when the third positioning member is not rotated.

13. The device-securing structure as claimed in claim 11, further comprising a third engagement module connected to the base, the third engagement module comprising a third driving member, a third engagement member and a third spring, the third driving member having one end protruding from the bottom and the other end abutted against the third engagement member; the third operative end of the third positioning member further comprising a third corresponding engagement part; the third driving member driving the third engagement member to move when the third driving member is pressed to engage the third engagement member and the third corresponding engagement part so as to secure the third positioning member that has been rotated.

14. The device-securing structure as claimed in claim 11, wherein the fourth positioning member comprises a fourth retaining end, a fourth pivoting part and a fourth operative end, the fourth pivoting part being disposed between the fourth retaining end and the fourth operative end, and the fourth positioning member being pivotally connected with the base with the fourth pivoting part, such that the fourth positioning member is rotatable when the fourth operative end is actuated and secures the portable electronic device with the fourth retaining end.

15. The device-securing structure as claimed in claim 14, wherein the second positioning module further comprises a fourth elastic member, the fourth elastic member being capable of repositioning the fourth positioning member after the rotation of the fourth positioning member and allowing the fourth operative end and the fourth retaining end to protrude from the bottom of the containing portion when the fourth positioning member is not rotated.

16. The device-securing structure as claimed in claim 14, further comprising a fourth engagement module connected to the base, the fourth engagement module comprising a fourth driving member, a fourth engagement member and a fourth spring, the fourth driving member having one end protruding from the bottom and the other end abutted against the fourth engagement member; the fourth operative end of the fourth positioning member further comprising a fourth corresponding engagement part; the fourth driving member drives the fourth engagement member to move when the fourth driving member is pressed to engage the fourth engagement member and the fourth corresponding engagement part so as to secure the fourth positioning member that has been rotated.

17. The device-securing structure as claimed in claim 1, wherein each of the first positioning member, the second positioning member, the third positioning member and the fourth positioning member is an L-shaped structural member.

18. The device-securing structure as claimed in claim 11, wherein the fourth positioning member is a guiding column protrudingly disposed at the bottom.

19. An electronic device, comprising:
a device main body; and
a device-securing structure connected with the device main body, the device-securing structure comprising:
a base comprising a containing portion insertable by a portable electronic device, the containing portion having a bottom and a receiving part, wherein the receiving part is disposed at the bottom;
a first positioning module comprising a first positioning member and a second positioning member disposed oppositely, the first positioning member and the second positioning member being movably connected to the base such that the first positioning member and the second positioning member may be moved into the receiving part by pressing of the portable electronic device; and
a second positioning module comprising a third positioning member and a fourth positioning member disposed oppositely, the third positioning member and the fourth positioning member being connected to the base, and the first positioning module being disposed between the third positioning member and the fourth positioning member; wherein when the third positioning member and the fourth positioning member clamp the portable electronic device, the first positioning member and the second positioning member are moved into the receiving part by pressing of the portable electronic device.

20. The electronic device as claimed in claim 19, wherein the first positioning member comprises a first retaining end, a first pivoting part and a first operative end, the first pivoting part being disposed between the first retaining end and the first operative end, and the first positioning member being pivotally connected with the base with the first pivoting part, such that the first positioning member is rotatable when the first operative end is actuated by pressing of the portable electronic device and secures the portable electronic device with the first retaining end; the second positioning member comprises a second retaining end, a second pivoting part and a second operative end, the second pivoting part being disposed between the second retaining end and the second operative end, the second positioning member being pivotally connected with the base with the second pivoting part, such that the second positioning member is rotatable when the second operative end is actuated by pressing of the portable electronic device and secures the portable electronic device with the second retaining end; the base further comprises a first guiding groove, a first pivoting member, a second guiding groove and a second pivoting member, the first pivoting member being configured for pivotally connecting to the first pivoting part of the first positioning member and being arranged in the first guiding groove, such that when the first positioning member is pressed, the first positioning member is moved with the first pivoting member along the first guiding groove into the receiving part; the second pivoting member being configured for pivotally connecting to the second pivoting part of the second positioning member and being arranged in the second guiding groove, such that when the second positioning member is pressed, the second positioning member is moved with the second pivoting member along the second guiding groove into the receiving part.

21. The electronic device as claimed in claim 19, wherein the first positioning member comprises a first retaining end, a first pivoting part and a first operative end, the first pivoting part being disposed between the first retaining end and the first operative end, and the first positioning member being pivotally connected with the base with the first pivoting part, such that the first positioning member is rotatable when the first operative end is actuated by pressing of the portable electronic device and secures the portable electronic device with the first retaining end; the second positioning member comprises a second retaining end, a second pivoting part and a second operative end, the second pivoting part being disposed between the second retaining end and the second operative end, and the second positioning member being pivotally connected with the base with the second pivoting part, such that the second positioning member is rotatable when the second operative end is actuated by pressing of the portable electronic device and secures the portable electronic device with the second retaining end.

* * * * *